United States Patent [19]

Timmons et al.

[11] Patent Number: 5,573,179

[45] Date of Patent: Nov. 12, 1996

[54] METHOD FOR CONTROLLING ENVIRONMENTAL CONDITIONS OF LIVING ORGANISMS BASED UPON TIME INTEGRATED VARIABLES

[75] Inventors: Michael B. Timmons, Ithaca, N.Y.; Richard S. Gates, Wilmore, Ky.

[73] Assignee: Cornell Research Foundation, Inc., Ithaca, N.Y.

[21] Appl. No.: 303,875

[22] Filed: Sep. 9, 1994

Related U.S. Application Data

[63] Continuation of Ser. No. 167,016, Dec. 16, 1993, abandoned.

[51] Int. Cl.$^6$ ............................ A01K 31/18; F24F 7/00
[52] U.S. Cl. .................... 236/6; 236/49.3; 236/78 DR
[58] Field of Search ........................... 236/49.3, 78 D, 236/46 R, 6; 47/17 EC; 237/3; 119/21

[56] References Cited

U.S. PATENT DOCUMENTS

| | | |
|---|---|---|
| Re. 33,600 | 6/1991 | Timmons . |
| 4,294,404 | 10/1981 | Gajjar . |
| 4,856,227 | 8/1989 | Oglevee et al. ............ 47/17 EC |
| 4,930,446 | 6/1990 | Huisinga . |
| 4,986,469 | 1/1991 | Sutton, Jr. . |
| 4,992,965 | 2/1965 | Holter et al. . |

*Primary Examiner*—William E. Wayner
*Attorney, Agent, or Firm*—Jones, Tullar & Cooper, P.C.

[57] ABSTRACT

A method for controlling environmental conditions or variables to which living organisms are exposed employs time integrated variables (TIVs) to assist in controlling the conditions. In one example, temperature in a poultry house is controlled, in part, according to a 24 hour time integrated average temperature value. Since it has been established that poultry is more sensitive to a 24 hour time integrated average temperature than to a particular instantaneous temperature, a temperature control strategy based upon the 24 hour time integrated average temperature can result in optimum performance of the poultry resulting in a substantial economic benefit. Further, in some instances the instantaneous temperature may be allowed to fluctuate over a wider range of temperatures, as long as the time integrated average temperature value is maintained within a desired range, and this can provide additional economic benefit from reduced operating expenses of the environmental control system. The invention can be applied to any living organism and any environmental variables which directly affect the organism in a time integrated average value manner.

6 Claims, 3 Drawing Sheets

METHOD FOR CONTROLLING ENVIRONMENTAL CONDITIONS OF LIVING ORGANISMS BASED UPON TIME INTEGRATED VARIABLES

This application is a continuation of application Ser. No. 08/167,016, filed Dec. 16, 1993, now abandoned.

BACKGROUND OF THE INVENTION

The present invention relates in general to a method for controlling environmental conditions to which living organisms, such as animals or plants, are exposed which employs time integrated variables (TIVs) in part to determine whether the environmental conditions should be adjusted.

Living organisms respond to multiple environmental stimuli. For example, homeothermic animals attempt to maintain some deep body set point temperature, but typically exhibit some steady periodic pattern to their environment. Since many of the environmental stimuli occur on a 24 hour repeating period, the animal's steady periodic response also behaves on the same temperature frequency pattern. An animal's capacity to integrate environmental stimuli also permits the animal to be subjected to a fairly wide range of environmental conditions, and still maintain homeostatic behavior. The wider the range of environmental conditions and the more extreme the conditions, the greater the energetic demand on the animal to maintain their homeostatic condition.

Commercial animal production is essentially all practiced based upon housing the animals under intensive conditions. An example is that of broilers in a poultry house. Maintaining an environment that is conducive for efficient animal productivity requires that the animal housing structure be equipped with a heating, cooling and ventilation system. Environmental control systems usually consist of electromechanical controls, such as thermostats, which simply activate or deactivate equipment as an inside environmental condition either exceeds or falls below some value selected by the human manager. The degree of sophistication of such systems may become increasingly complex, but essentially control still reverts to comparisons of current conditions with set point conditions.

Controllers are currently in use that are based upon microelectronics. With these, control can be based upon more than instantaneous conditions, since a microprocessor based controller has the capability to record environmental conditions in memory, and then to manipulate the stored data according to predefined algorithms to produce time integrated variables. It is typical in these controllers that independent environmental data be collected over some time interval, and then the average value of the variable over the interval is used to determine control decisions. Usually these intervals are short, on the order of milliseconds, and are simply used to provide a more stable measurement of the environmental variable. These intervals have nothing to do with the organisms whose environment is being controlled, but are simply for stability of the controller measurements. Similarly, other schemes used to achieve efficiency and control of environments strive to achieve specific target values which are determined to provide the optimum operating efficiency of the environmental control system. However, these schemes fail to take into account how the organism whose environment is being controlled, respond to the environmental variables, and thus may fail to provide the optimum environment for the organisms.

A specific problem with all prior art environmental controllers is that they do not take into account how the organism responds to the environmental conditions over time. Thus, for example, a temperature controller in a poultry house which attempts only to maintain the instantaneous temperature in the poultry house at a target value, fails to take into account how poultry respond to temperature variances over a period of time, e.g. 24 hours. The failure of the prior art controllers to take this into account results in exposure of the poultry to less than optimum conditions, which is detrimental from an economic standpoint due to less than optimum performance and health of the poultry. In addition, this often results in excessive energy usage of the environmental control devices.

SUMMARY OF THE INVENTION

The present invention overcomes the drawbacks of the prior art by providing a method for controlling environmental conditions which directly affect living organisms, that is based upon the time integration of variables related to the conditions over predetermined time periods. The theory which forms the basis for the present invention is based upon the fact that animals, in particular poultry, have been shown to respond to environmental conditions based on time cycles, such as 24 hours. For example, in the case of temperature, it has been discovered that poultry is more sensitive to the time integrated value of the temperature over a 24 hour cycle, rather than the instantaneous value of the temperature at any given time during the 24 hour period, provided that the temperature or other environmental variable is within a physiologically reasonable range. Thus, for example, if it is determined that the optimum integrated temperature over a 24 hour time interval for poultry is in the range of 70° to 80° F., then this time integrated variable should be continuously monitored and used to assist in controlling the operation of heaters or coolers, as necessary.

In its broadest sense, the present invention comprises a method for controlling environmental conditions to which living organisms, such as animals or plants, are exposed in which the control of the environmental conditions is based, not only on instantaneous values of environmental variables, but also upon time integrated variables that have been established to have a direct effect on the well being of the organisms. In the preferred form of the invention, the TIV method of control is employed in parallel with the conventional instantaneous method of control so that the TIV method takes priority, and the instantaneous method is employed only when either the TIV method is also satisfied, or extremes of instantaneous values of the variables occur.

A specific example of the application of the present invention to temperature control in poultry houses will better illustrate the essence of the invention. In the summer months, the internal temperature in a poultry house can exceed 90° F., and ventilation fans are typically employed in stages to cool the house. Unfortunately, ventilation fans usually cannot cool the poultry house enough during the hot daytime hours to achieve the desired instantaneous temperature. This exposes the poultry to excessively high temperatures for an extended period of time. In a conventional fan controller, as the poultry house temperature is slowly reduced to a desired instantaneous temperature during the nighttime hours, the ventilation fans will be gradually shut off in stages. Unfortunately, this method of control fails to consider that the time integrated temperature value, and thus the cumulative heat stress that has been imparted upon the birds, is still too high. With the present invention, however, the time integrated value of the temperature in the poultry house is used to alter the control strategy of the ventilation fans so that a higher ventilation rate is called for into the nighttime hours to provide extra cooling of the poultry house, thereby quickly bringing the time integrated average temperature back down within the desired range.

As stated above, the instantaneous and time integrated values of the environmental variable to be controlled are preferably employed as parallel inputs to the controller so that decisions on whether to actuate a control device are based both on the time integrated and instantaneous values of the variable to be controlled. This helps insure that the animals or plants will not be exposed to extremes of instantaneous values of an environmental variable as a result of the control device attempting to adjust the time integrated value of the variable. For example, in the poultry house temperature control method discussed above, it may be determined that under no circumstances should the instantaneous temperature in the poultry house drop below a certain minimum temperature. In the event that the instantaneous temperature does drop below this set limit, the cooling fans will be shut off even if the time integrated value of the temperature remains above the selected range.

The use of this method of environmental control based on TIVs is very beneficial due to its increased economic productivity. In the poultry house example, this economic productivity will be reflected in increased egg production and/or improved feed conversion in the case of laying hens and increased size and decreased mortality rates and/or improved feed conversion in the case of broilers. In addition, as long as the time integrated value of an environmental variable is maintained within an optimum range, the instantaneous value of that variable may be allowed to fluctuate over a broader range than in a conventional controller. Under these circumstances, the operating efficiency of the environmental control system can be increased, thus providing additional economic savings.

BRIEF DESCRIPTION OF THE DRAWINGS

The advantages and features of the present invention will become more apparent from the following detailed description of a preferred embodiment thereof, taken in conjunction with the accompanying drawings in which.

DETAILED DESCRIPTION OF THE PREFERRED EMBODIMENTS

Figure 1:
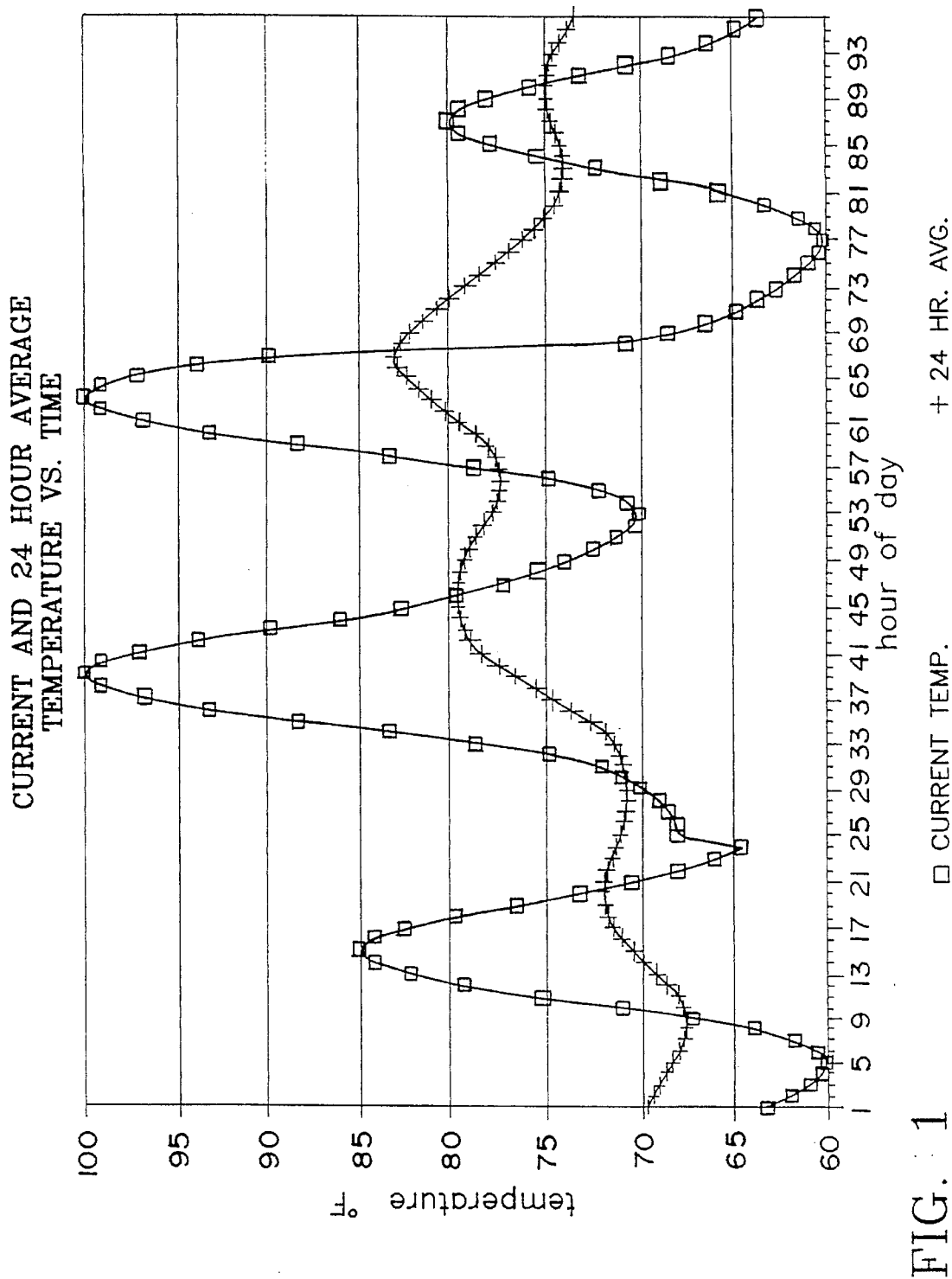
FIG. 1 is a graph illustrating both the instantaneous value of temperature as a function of time and the time integrated value of temperature (calculated according to one type of averaging scheme) as a function of time resulting from temperature control according to the method of the present invention.

Turning now to the more detailed consideration of a preferred embodiment of the invention, the method of the invention can be employed to control any number of environmental parameters which directly affect the health, well being and therefore production response of a living organism, such as for example, temperature, humidity, oxygen, carbon dioxide, etc. The method can be carried out by any suitable environmental controller capable of keeping a time history of the sensed environmental variables. An example of such a controller is the Aerostager Environmental Controller sold by Aerotech, Inc. of Lansing, Michigan. The controller can be employed for example, in an environmental control system for poultry houses, such as the one disclosed in U.S. Pat. No. Re. 33,600 to Timmons, which is hereby incorporated by reference.

The heart of the invention lies in the determination that living organisms, such as plants and animals, respond more to time averaged values of environmental variables over a time interval, than they do to the instantaneous values of those variables. These time integrated values of environmental variables must therefore be considered to determine the control strategy of the various environmental variables which provides the optimum environment, and therefore production response, for the organisms.

The time integrated value of the variable is the average value of the variable over a given time period, and thus can alternatively be referenced to as the time integrated "average" value of the variable. It is obtained by integrating the instantaenous value of the variable over a predetermined time period (e.g., 24 hours), and then dividing by the time period to obtain the average value. As discussed in greater detail below, the time integrated value is calculated continuously in the method of the present invention so that the value at any given instant is the average value of the variable over the time interval immediately preceding that instant.

With this in mind, the method of the invention, in its broadest sense, operates as follows. First, a time integrating interval period must be selected for each environmental variable to be controlled. This is selected based upon scientific knowledge of how the living organism responds to each of the variables. For example, it has been determined that certain types of poultry in poultry houses are production responsive to the time integrated value of temperature over a 24 hour interval. Thus the time integrating interval period for controlling temperature in such a poultry house should be selected to be 24 hours. Of course it will be understood that any time interval can be selected as necessary, and the intervals may be different depending upon the environmental variable to be controlled.

Next, the desired range of time integrated values for each of the environmental variables which provides the optimum environment for the living organism is selected. In addition, a maximum desired range of instantaneous values for these variables is also selected.

With the aforementioned information, the environmental controller begins continuous calculations of the time integrated value for all of the environmental variables being monitored, as well as the instantaneous values. In addition, the elapsed time from the controller start up is measured. At first, the controller only responds to the instantaneous values of the environmental variables. This continues until the elapsed time from controller start up equals the chosen integrating time interval for each of the variables. This feature is to insure that sufficient data has been collected after start up to permit accurate determination of the time integrated average value of each variable.

Once the controller has been operating for at least a length of time equal to the integrating time interval, the corresponding calculated time integrated value of each of the variables being monitored is compared to its range of desired time integrated values. The instantaneous values of each variable are also compared to the maximum and minimum allowable values to insure that the values fall within the desired range. This step acts as an override for the time integrated value control feature of the invention to insure that the instantaneous values of the various environmental variables do not achieve levels which would be detrimental to the well being of the living organisms.

FIG. 1 is a sample graph illustrating how the time integrated 24 hour average temperature (calculated in accordance with one of a number of suitable algorithms) fluctuates in response to changes in the instantaneous temperature in a typical poultry house during the summer months. The graph represents 4 days or 96 hours of time, and thus there are 4 peak maximum values of instantaneous temperature indicative of the daytime high temperature for each day, and four minimum instantaneous temperatures representing the low nighttime temperature for each day. As illustrated, the time integrated 24 hour average only fluctuates over an approximately 15° F. range of 68° F. to 83° F., whereas the instantaneous temperature fluctuates over a much wider range of approximately 40° F. from 60° F. to 100° F. Clearly, it will take much less heating and cooling energy to cause the time integrated average temperature to stay within a selected range of values, than it would to cause the instantaneous temperature to maintain a set value. Accordingly, in instances where it is established that the optimum production response of the organisms whose environment is being controlled can be achieved through time integrated averaging control of the various environmental variables, combined with instantaneous control over a wider range of values, significant economic savings may be realized through increased operating efficiency of the environmental control system. However, it is much more significant that the optimum production response of the organisms is achieved through the use of TIV control, for when the production response of the organisms is optimized, a far greater economic benefit will result than results from any incidental increase in the operating efficiency of the environmental control system. In fact, the environmental control system may actually be operated less efficiently in some instances to maintain the TIV value within the desired range, and the overall economic benefit will still be greater using the TIV control method.

The modifications necessary to adapt the Aerostager Environmental Controller for operation in response to time integrated variables are fairly straightforward. In particular, the Aerostager controller is conventionally employed in a poultry or animal house to control staged operation of a plurality of heaters and ventilation fans as illustrated by the graph in FIG. 2. As illustrated, 8 ventilation stages and 1 heat stage are provided and the ventilation stage selected by the controller depends on the magnitude of the temperature differential ($_\Delta t$) between the instantaneous desired room temperature (DRT) and the actual inside temperature. Thus, as the $_\Delta t$ increases, the Aerostager controller sequences through each ventilation stage in which additional ventilation capacity is provided until at stage 8 when the $_\Delta t$ exceeds 14° F., full ventilation is called for by the controller. At this point, no additional ventilation can be implemented which will result in continuous increases in the inside temperature if the thermal load on the building continues to increase.

Figure 2:
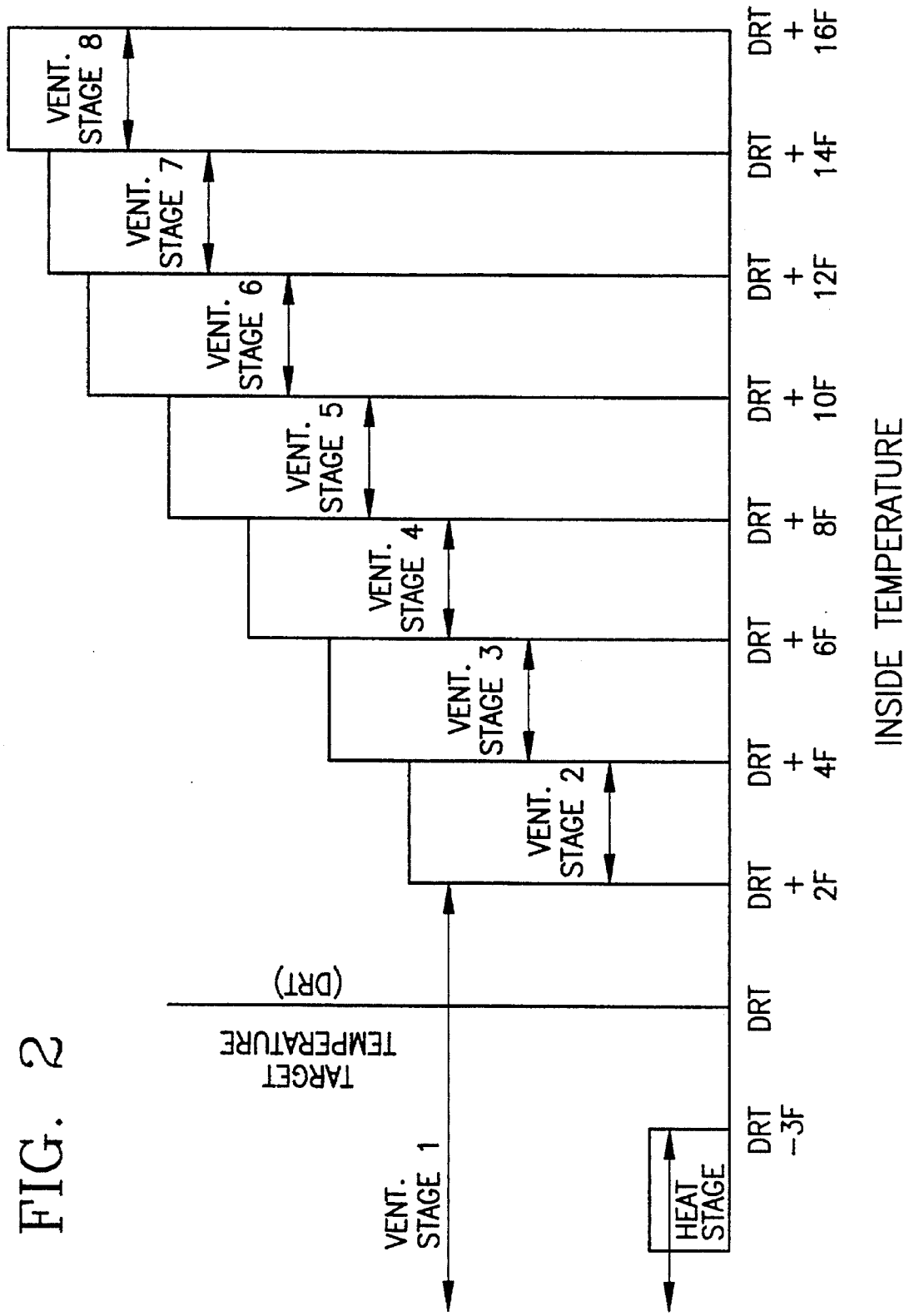
FIG. 2 is a graph illustrating heating and cooling stages of an Aerostager Environmental Controller which may be modified to operate in accordance with the method of the present invention; and, FIG. 3 is a flow chart illustrating the program steps necessary to modify the control strategy of the Aerostager Environmental Controller in accordance with the method of the present invention.
Figure 3:
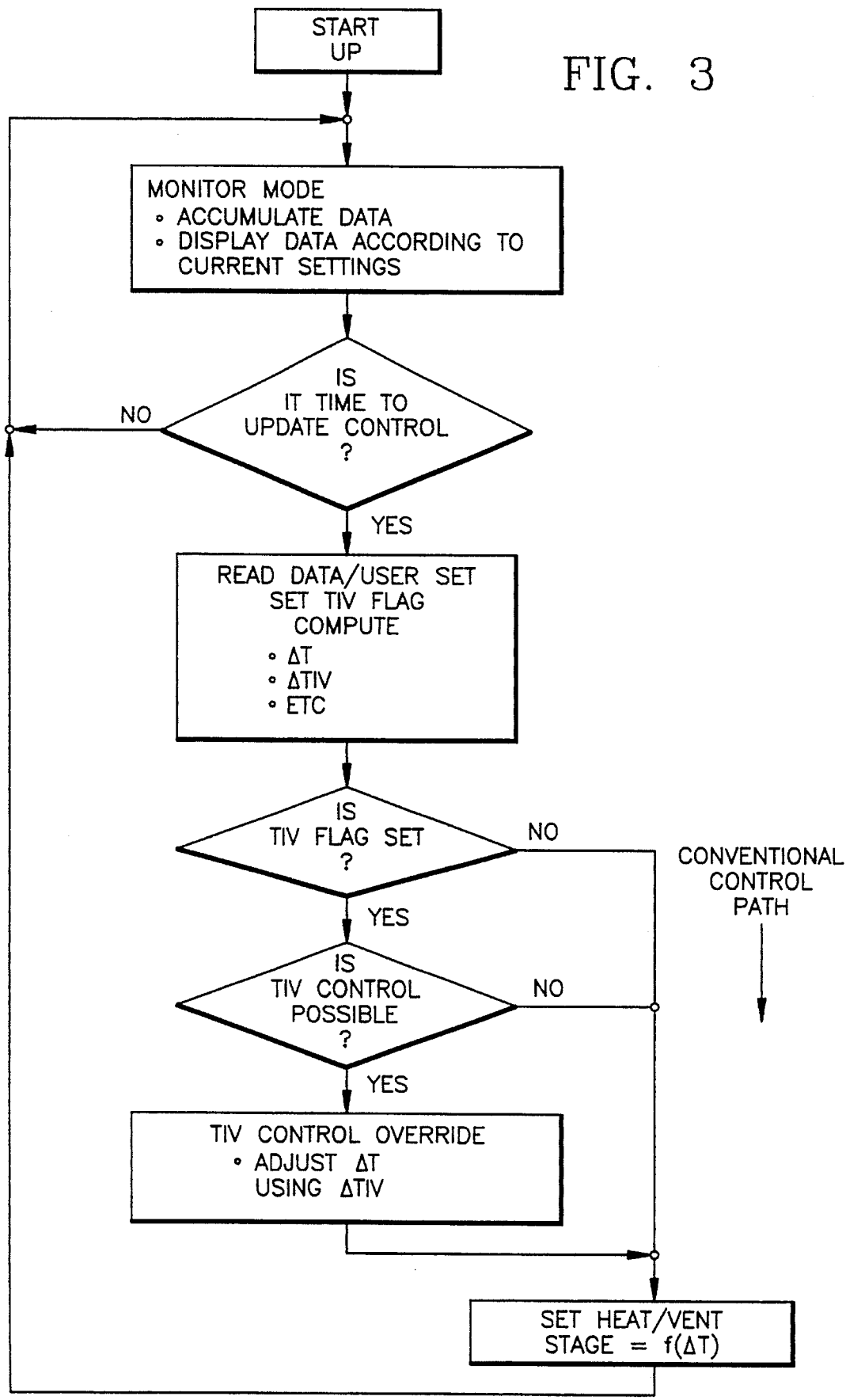

The sequence of stages illustrated in FIG. 2 need not be changed to adapt the Aerostager controller to use with the present invention. Instead, as illustrated in the flow chart of FIG. 3, a separate program can be implemented which adjusts the $_\Delta t$ and/or stage calculation as necessary to accommodate TIV responsive control. In particular, if the TIV flag is set "true" thus indicating that the TIV value for the control variable has deviated out of the desired range (either above or below), then the program inquires whether TIV control is possible under current conditions. If the TIV value has exceeded the desired range, TIV responsive control is possible as long as the instantaneous temperature is not below the preselected minimum desired temperature. Similarly, if the TIV value drops below the range of desired TIV values, TIV responsive control will be permitted as long as the instantaneous temperature is not above the preselected maximum desired temperature.

Once it is determined that TIV responsive control is permitted, then TIV control override is implemented and an algorithm is employed by the Aerostager controller for stage selection in accordance with the TIV control strategy, depending upon the difference between the desired TIV value and the actual TIV value ($_\Delta$TIV). For example, suppose that the instantaneous temperature in the poultry house is 9° F. higher than the instantaneous DRT. Using conventional control and referencing FIG. 2, ventilation stage 5 will be implemented by the Aerostager controller. If, however, it is determined that the current TIV value is too high, the program can modify the $_\Delta t$ which the Aerostager controller uses, and increase the ventilation stage level to provide extra cooling. For example, the TIV control override program may add 10° F. to the actual $_\Delta t$ so that the Aerostager controller will implement stage 8 (maximum ventilation rate) instead of stage 5. Thus, extra cooling of the poultry house will be provided in an effort to lower the TIV value back within the desired range, without lowering the instantaneous temperature below the desired minimum value. It will be understood that the particular algorithm or program for TIV control can be selected as desired to best suit a particular application, and the above example represents only one of many possible algorithms which can be employed to implement TIV control.

Returning once again to FIG. 3, if the TIV flag is not set "true" which indicates that the current TIV value for the control variable is within the desired range, conventional control of the Aerostager controller occurs. Under these circumstances, the Aerostager controller will attempt to maintain a desired instantaneous temperature or range of desired instantaneous temperatures. This range can of course be selected as desired, and may in fact be higher or lower than would normally be selected if a conventional control strategy were the only one available. Thus for example, the controller operator may decide that the instantaneous temperature in the poultry house can go much higher during the daytime hours, as long as the time integrated value of the temperature remains within the desired range of time integrated values. Under these circumstances, the environmental control system may be actuated in a more efficient manner, which contributes to the economic savings provided by TIV based control.

Although the invention has been described in terms of a preferred embodiment, it will be understood the numerous variations and modifications could be made thereto without departing from the scope of the invention as set forth in the following claims.

What is claimed is:

1. A method for controlling environmental conditions of living organisms comprising the steps of:

a) selecting at least one environmental variable having a direct effect on a living organism which is exposed to said variable;

b) selecting a time interval length over which the living organism is directly affected by the average value of the variable over said time interval known as the time integrated average value of the selected environmental variable;

c) selecting a range of time integrated average values of the selected variable which provides the optimum environment for the living organism;

d) selecting a desired range of instantaneous values of the selected environmental variable;

e) determining the time integrated average value of the selected environmental variable over said time interval length;

f) comparing the determined time integrated average value to the selected range of time integrated average values;

g) sensing the instantaneous value of the selected environmental variable;

h) comparing the sensed instantaneous value with the desired range of instantaneous values; and, i) controlling operation of at least one environmental control device for the selected environmental variable to raise the instantaneous value of the environmental variable if either the sensed instantaneous value is below the desired range of instantaneous values or the determined time integrated average value is below the selected range of time integrated average values and the sensed instantaneous value is not above the desired range of instantaneous values; and alternatively, to lower the instantaneous value of the selected environmental variable if either the sensed instantaneous value is above the desired range of instantaneous values or the determined time integrated average value is above the selected range of time integrated average values and the instantaneous value is not below the desired range of instantaneous values.

2. The method of claim 1 wherein the step of controlling further comprises controlling operation of at least one environmental control device for the selected environmental variable to raise the instantaneous value of the environmental variable in accordance with a conventional control strategy if the sensed instantaneous value is below the desired range of instantaneous values and the determined time integrated average value is not below the desired range of time integrated average values; to raise the instantaneous value of the environmental variable in accordance with a time integrated value based control strategy if the determined time integrated average value is below the desired range of time integrated average values and the sensed instantaneous value is not above the desired range of instantaneous values; to lower the instantaneous value of the selected environmental variable in accordance with a conventional control strategy if the sensed instantaneous value is above the desired range of instantaneous values and the determined time integrated average value is not above the desired range of time integrated average values; and, to lower the instantaneous value of the selected environmental variable in accordance with a time integrated average value based control strategy if the determined time integrated average value is above the desired range of time integrated average values and the instantaneous value is not below the desired range of instantaneous values.

3. The method of claim 1, further comprising the steps of selecting temperature as said environmental variable and selecting poultry as the living organism which is exposed to said environmental variable.

4. The method of claim 2, further comprising the steps of selecting temperature as said environmental variable and selecting poultry as the living organism which is exposed to said environmental variable.

5. A method for controlling environmental conditions of living organisms comprising the steps of:

a) selecting at least one environmental variable having a direct effect on a living organism which is exposed to said variable;

b) selecting a time interval length over which the living organism is directly affected by the average value of the variable over said time interval known as the time integrated average value of the selected environmental variable;

c) selecting a range of time integrated average values of the selected variable which provides the optimum environment for the living organism;

d) determining the time integrated average value of the selected environmental variable over said time interval length;

e) comparing the determined time integrated average value to the selected range of time integrated average values; and, f) controlling operation of at least one environmental control device for the selected environmental variable to raise the instantaneous value of the environmental variable if the determined time integrated average value is below the selected range of time integrated average values; and alternatively, to lower the instantaneous value of the selected environmental variable if the determined time integrated average value is above a selected range of time integrated average values.

6. The method of claim 5, further comprising the steps of selecting temperature as said environmental variable and selecting poultry as the living organism which is exposed to said environmental variable.

* * * * *